United States Patent
Hirosawa et al.

(10) Patent No.: US 9,785,212 B2
(45) Date of Patent: Oct. 10, 2017

(54) DOCK WITH BATTERY FOR CHARGING ELECTRONIC DEVICE BATTERY WITH VOLTAGE CONVERSION

(71) Applicant: KABUSHIKI KAISHA TOSHIBA, Minato-ku, Tokyo (JP)

(72) Inventors: Hideki Hirosawa, Gunma (JP); Yutaka Horie, Tokyo (JP); Akio Kanou, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 117 days.

(21) Appl. No.: 14/826,574

(22) Filed: Aug. 14, 2015

(65) Prior Publication Data
US 2016/0134137 A1    May 12, 2016

Related U.S. Application Data
(60) Provisional application No. 62/078,244, filed on Nov. 11, 2014.

(51) Int. Cl.
*H02J 7/00*    (2006.01)
*G06F 1/26*    (2006.01)

(52) U.S. Cl.
CPC .............. *G06F 1/26* (2013.01); *H02J 7/0052* (2013.01); *H02J 7/0054* (2013.01); *H02J 2007/006* (2013.01)

(58) Field of Classification Search
CPC ....... H02J 7/0054; H02J 7/0044; H02J 7/0027
USPC ................................................. 320/103, 115
See application file for complete search history.

(56) References Cited

U.S. PATENT DOCUMENTS

| | | | |
|---|---|---|---|
| 6,603,285 B2 | 8/2003 | Aoyagi et al. | |
| 7,432,685 B2 | 10/2008 | Hayashi | |
| 2004/0164711 A1 | 8/2004 | Hayashi | |
| 2008/0036419 A1* | 2/2008 | Cook | H02J 7/0031 320/104 |
| 2010/0093401 A1* | 4/2010 | Moran | G06F 1/1626 455/566 |
| 2013/0038288 A1* | 2/2013 | Yeh | H02J 7/0027 320/114 |
| 2015/0270733 A1* | 9/2015 | Inha | H02J 7/0054 320/103 |

FOREIGN PATENT DOCUMENTS

| | | |
|---|---|---|
| JP | 10-198468 | 7/1998 |
| JP | 2002-101574 | 4/2002 |
| JP | 2004-260909 | 9/2004 |

* cited by examiner

*Primary Examiner* — Richard Isla Rodas
*Assistant Examiner* — David V Henze-Gongola
(74) *Attorney, Agent, or Firm* — Foley & Lardner LLP

(57) ABSTRACT

According to one embodiment, a system includes an electronic device and an extension device to which the electronic device is detachable from and attachable. The electronic device includes a first battery, and a voltage step-down circuit to charge the first battery with first power supplied from the extension device after stepping down or without stepping down voltage of the first power. The extension device includes a second battery, and a voltage step-up circuit to supply the electronic device with second power supplied from the second battery after stepping up or without stepping up voltage of the second power.

3 Claims, 10 Drawing Sheets

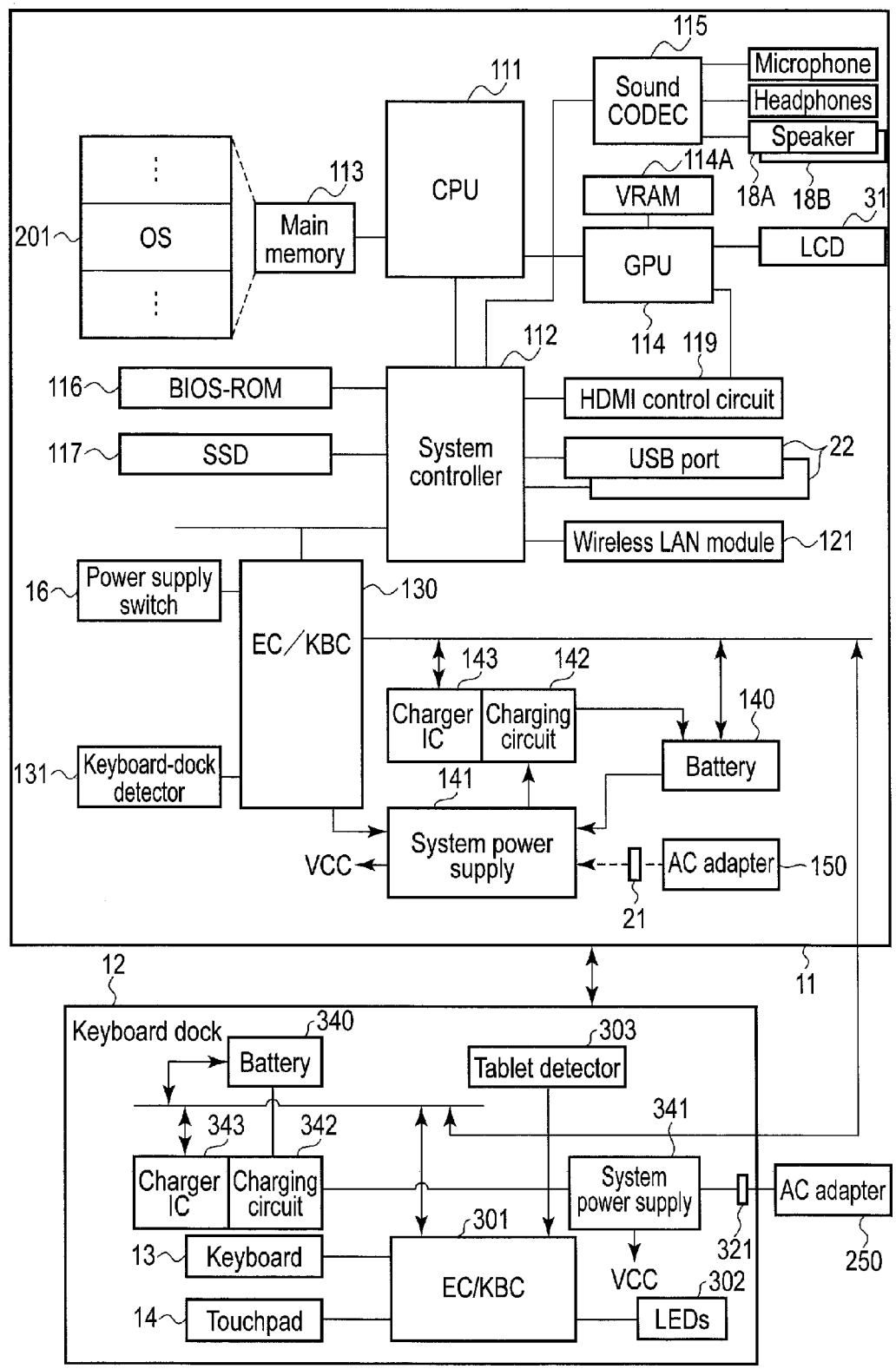
F I G. 2

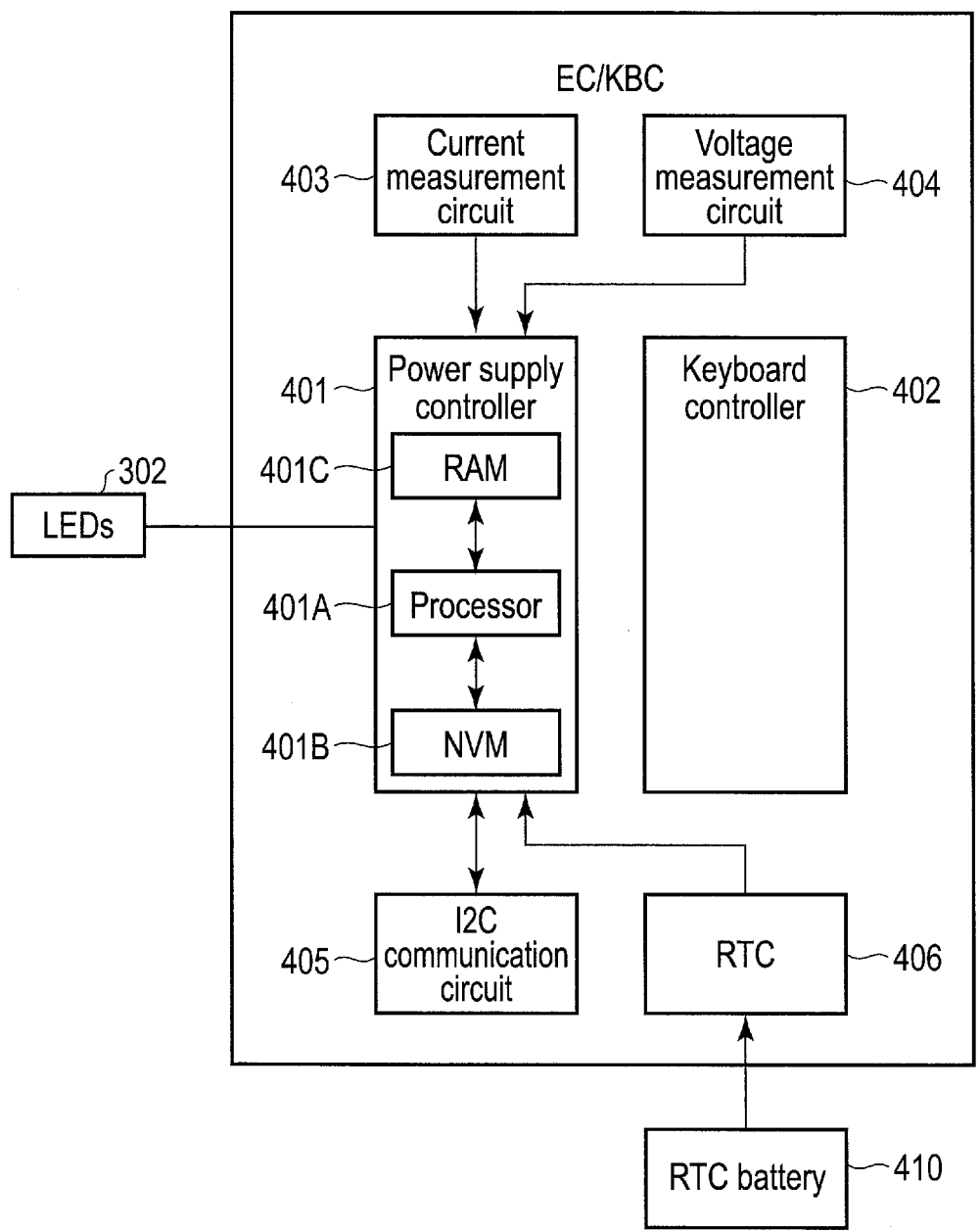
F I G. 3

|  | Voltage of battery T > voltage of battery K | Voltage of battery T equal to voltage of battery K, or voltage of battery K slightly greater than voltage of battery T | Voltage of battery T < voltage of battery K |
|---|---|---|---|
| Keyboard dock | Step up voltage | Not step up or step down voltage | Not step up or step down voltage |
| Tablet | Not step up or step down voltage | Not step up or step down voltage | Step down voltage |
|  | Voltage stepped up by one step | Voltage not stepped up or stepped down | Voltage stepped down by one step |
|  | Mode 1 (FIG. 6) | Mode 2 (FIG. 7) | Mode 3 (FIG. 8) |

F I G. 5

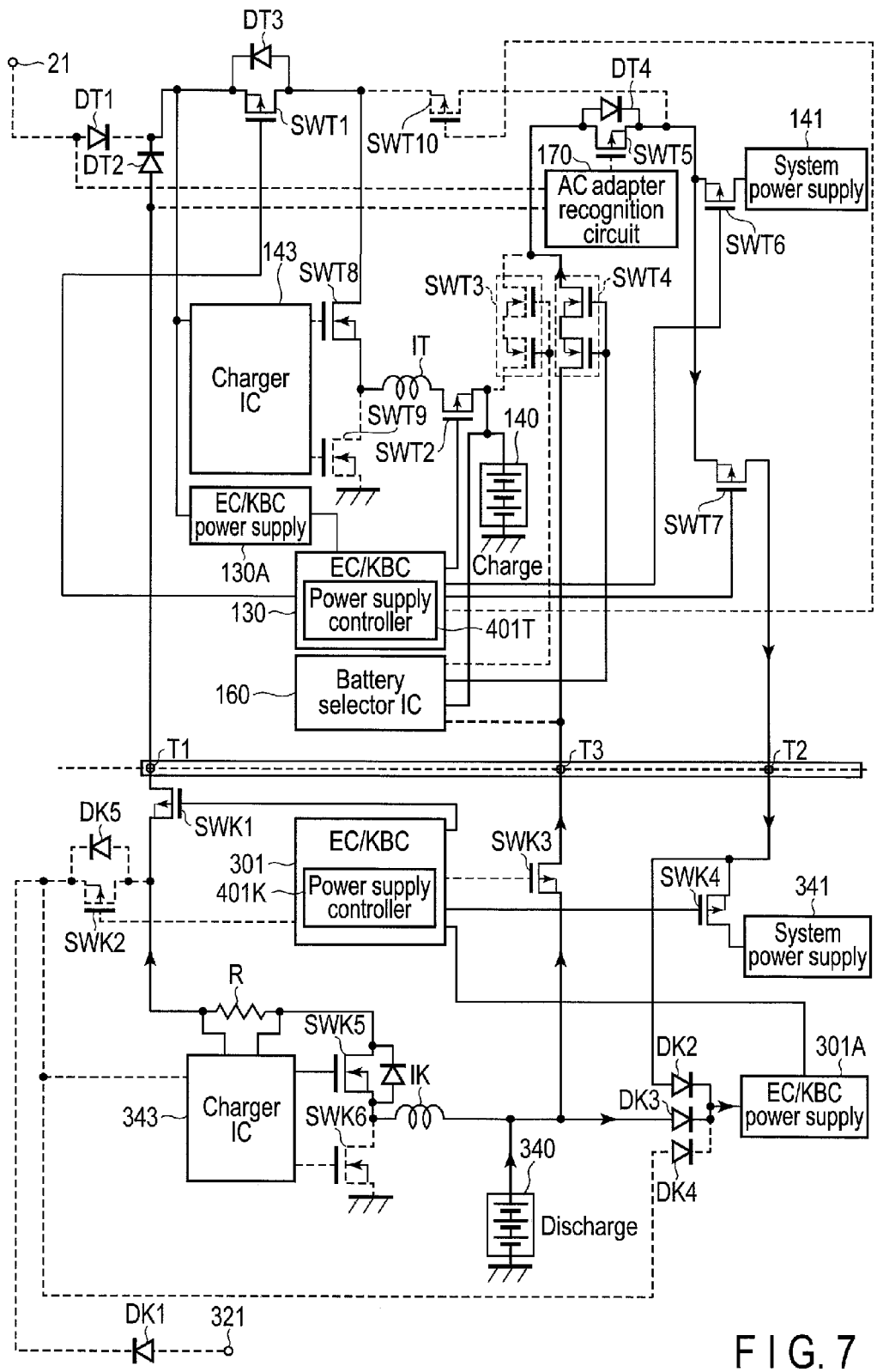
F I G. 7

|  | Conversion efficiency | | |
| --- | --- | --- | --- |
|  | Keyboard dock | Tablet | Total |
| Mode 1 | 0.91 (Step up voltage) | 1.00 (Not step up or step down voltage) | 0.91 |
| Mode 2 | 1.00 (Not step up or step down voltage) | 1.00 (Not step up or step down voltage) | 1.00 |
| Mode 3 | 1.00 (Not step up or step down voltage) | 0.95 (Step down voltage) | 0.95 |

F I G. 10

DOCK WITH BATTERY FOR CHARGING ELECTRONIC DEVICE BATTERY WITH VOLTAGE CONVERSION

CROSS-REFERENCE TO RELATED APPLICATIONS

This application claims the benefit of U.S. Provisional Application No. 62/078,244, filed Nov. 11, 2014, the entire contents of which are incorporated herein by reference.

FIELD

Embodiments described herein relate generally to a system in which an electronic apparatus and an extension apparatus are each provided with a battery.

BACKGROUND

In recent years, 2-in-1 PCs which can be used in the two forms of a notebook personal computer (PC) and a tablet have been sold. The 2-in-1 PCs include a detachable 2-in-1 PC system in which a housing comprising a display is attachable to and detachable from a housing comprising a keyboard.

In some detachable 2-in-1 PCs, a housing comprising a display and a housing comprising a keyboard are each provided with a battery. If a housing comprising a display and a housing comprising a keyboard are each provided with a battery, a conversion loss of power occurs in supplying power from the battery on the housing side comprising the keyboard to a load circuit on the housing side comprising the display and in charging the battery on the housing side comprising the display.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary block diagram showing a configuration of the system according to the embodiment.

FIG. 3 is an exemplary functional block diagram showing a configuration of an EC/KBC according to the embodiment.

FIG. 5 is an illustration showing a method of supplying DC power from a keyboard dock to a tablet and a method of supplying DC power to a battery on the tablet side depending on the voltage of the battery on the tablet side and the voltage of a battery on the keyboard dock side.

FIG. 7 is an illustration for explaining the case where the battery on the tablet side is charged with DC power from the battery of the keyboard dock if the voltage of the battery on the tablet side and the voltage of the battery on the keyboard dock side are equal, or if the voltage of the battery on the keyboard dock side is slightly greater than the voltage of the battery on the tablet side.

FIG. 10 is an illustration showing conversion efficiency in each mode.

DETAILED DESCRIPTION

In general, according to one embodiment, a system includes an electronic apparatus and an extension apparatus which the electronic apparatus is detachable from and attachable to. The electronic apparatus comprises a first battery and a voltage step-down circuit configured to charge the first battery with first power supplied from the extension apparatus after stepping down or without stepping down voltage of the first power. The extension apparatus comprises a second battery and a voltage step-up circuit configured to supply the electronic apparatus with second power supplied from the second battery after stepping up or without stepping up voltage of the second power. The voltage step-down circuit steps down the voltage or the voltage step-up circuit steps up the voltage, or the voltage step-down circuit does not step down the voltage and the voltage step-up circuit does not step up the voltage, depending on the voltage of the first battery and the voltage of the second battery.

Various embodiments will be described hereinafter with reference to the accompanying drawings.

Figure 1:
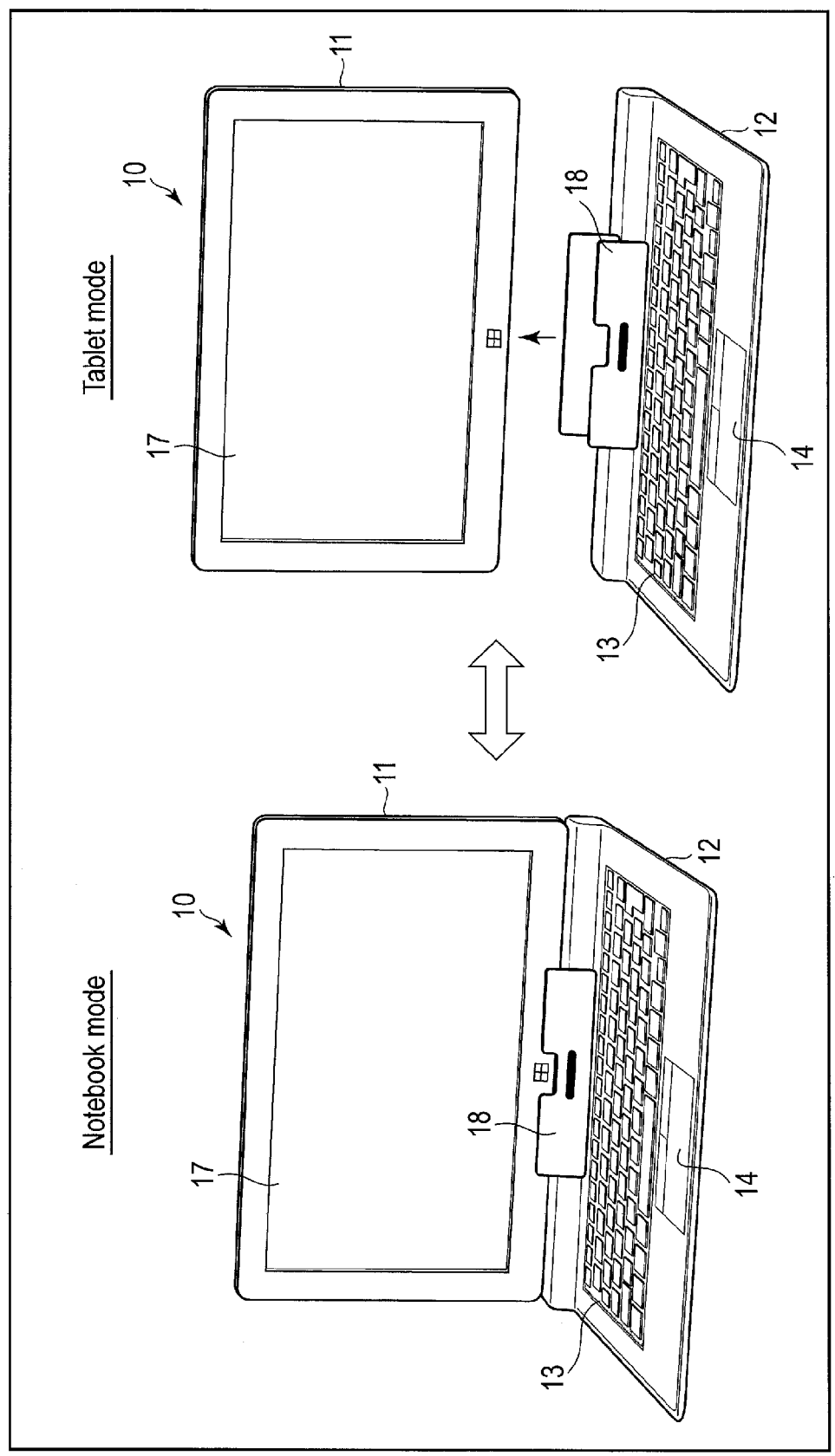
FIG. 1 is an exemplary perspective view showing an outside of a system according to an embodiment.

FIG. 1 is an illustration showing an outside corresponding to each of a notebook mode and a tablet mode of an electronic apparatus according to one embodiment. The electronic apparatus is implemented as, for example, a 2-in-1 personal computer (PC) system 10. The 2-in-1 PC system 10 is used in a style corresponding to the notebook mode shown in the left part of FIG. 1 or the tablet mode shown in the right part of FIG. 1.

The 2-in-1 PC system 10 comprises a keyboard dock 12 and a tablet 11. The keyboard dock 12 comprises a thin rectangular housing accommodating a keyboard, a battery, etc. On a top surface of the keyboard dock 12, a keyboard 13 and a touchpad 14 which is a pointing device are disposed. The touchpad 14 is disposed in a palm rest area on the top surface of the keyboard dock 12.

On a back side of the keyboard dock 12, a hinge 18 is provided. The tablet 11 is detachable from and attachable to the hinge 18 (the keyboard dock 12). In the tablet mode, the tablet 11 is detached from the keyboard dock 12 while being used.

On a front surface of the tablet 11, that is, a display surface of the tablet 11, a display 17 is disposed. The display 17 is implemented as a touchscreen display which can detect a position of a pen or a finger on a screen of the display 17.

In the notebook mode, the 2-in-1 PC system 10 is used mainly in the state of being placed on a horizontal plane, for example, a desk. A user operates mainly the keyboard 13 as in a normal notebook computer.

On the other hand, in the tablet mode, the tablet 11 is used mainly in the state of being held by one hand or both hands of the user. The user, for example, holds the 2-in-1 PC system 10 in one hand, and performs a touch operation on the display 17 by the other hand.

FIG. 2 shows a system configuration of the 2-in-1 PC system 10 in the embodiment. The tablet 11 of the 2-in-1 PC system 10 comprises a CPU 111, a system controller 112, a main memory 113, a graphics processing unit (GPU) 114, a sound CODEC 115, a BIOS-ROM 116, a solid-state drive (SSD) 117, a wireless LAN module 121, an embedded controller/keyboard controller IC (EC/KBC) 130, a keyboard-dock detector 131, a charging circuit 142, a charger IC 143, etc.

The CPU 111 is a processor which controls operation of each component of the 2-in-1 PC system 10. The CPU 111 executes various programs loaded from the HDD 117 to the main memory 113. The programs include an operating system (OS) and various application programs.

In addition, the CPU 111 also executes a Basic Input/Output System (BIOS) stored in the BIOS-ROM 116, which is a nonvolatile memory. The BIOS is a system program for hardware control.

The GPU 114 is a display controller which controls the LCD 17 used as a display monitor of the 2-in-1 PC system 10. The GPU 114 generates a display signal (LVDS signal) to be supplied to the LCD 17 from display data stored in a video memory (VRAM) 114A. Moreover, the GPU 114 can also generate an HDMI video signal from display data. An HDMI control circuit 119 is an interface for sending an HDMI video signal and a digital audio signal to an external display through, for example, an HDMI output terminal provided at the keyboard dock 12.

The system controller 112 is a bridge device which connects the CPU 111 and each component. The system controller 112 contains a serial ATA controller for controlling the solid-state drive (SSD) 117.

Further, to the system controller 112, devices such as a USB port 22 and the wireless LAN module 121 are connected.

Moreover, the system controller 112 communicates with each device connected through a bus.

The EC/KBC 130 is connected to the system controller 112 through a bus. In addition, the EC/KBC 130, and the charger IC 143 and a battery 140, are connected to each other through a serial bus.

The EC/KBC 130 is a power management controller for performing power management of the tablet 11, and is implemented as, for example, a single-chip microcomputer containing a keyboard controller which controls a keyboard (KB), a touchpad, etc. The EC/KBC 130 has a function of powering on or powering off the 2-in-1 PC system 10 in response to the user's operation of a power supply switch 16. The control of powering on or powering off the 2-in-1 PC system 10 is executed over a system power supply 141 by the EC/KBC 130.

The keyboard-dock detector 131 detects whether the tablet 11 is mounted on the keyboard dock 12. The keyboard-dock detector 131 notifies the EC/KBC 130 of a detection result.

The charger IC 143 is an IC which controls the charging circuit 142 under the control of the EC/KBC 130. The EC/KBC 130, the charger IC 143, and the system power supply 141 operate on power from the battery 140 or an AC adapter 150 connected to a power supply port 21 even when the 2-in-1 PC system 10 is powered off.

The system power supply 141 generates power (operation power) to be supplied to each component with any of power from the battery 140, power from the AC adapter 150 connected to the tablet 11 as an external power supply, and power from a dock. In addition, the system power supply 141 supplies power with which the battery 140 is charged by the charging circuit 142.

The charging circuit 142 charges the battery 140 with power supplied through the system power supply 141 under the control of the charger IC 143.

The keyboard dock 12 comprises the keyboard 13, the touchpad 14, an EC/KBC 301, LEDs 302, a tablet detector 303, a battery 340, a system power supply 341, a charging circuit 342, a charger IC 343, etc.

The EC/KBC 301 is a power management controller for performing power management of the keyboard dock 12, and is implemented as, for example, a single-chip microcomputer containing a keyboard controller which controls the keyboard (KB) 13, the touchpad 14, etc.

The tablet detector 303 detects whether the tablet 11 is mounted on the keyboard dock 12. The keyboard-dock detector 131 notifies the EC/KBC 130 of a detection result.

The charger IC 343 is an IC which controls the charging circuit 342 under the control of the EC/KBC 301.

The system power supply 341 generates power (operation power) to be supplied to each component and the 2-in-1 PC system 10 with power from the battery 340 or power supplied from an AC adapter 250 connected as an external power supply through a power supply port 321. In addition, the system power supply 341 supplies power with which the battery 340 is charged by the charging circuit 342.

The charging circuit 342 charges the battery 340 with DC power under the control of the charger IC 343.

The EC/KBC 301 controls a lighting state of the LEDs 302 depending on a remaining capacity of the battery 340.

FIG. 3 is a block diagram showing a configuration of the EC/KBCs 130 and 301. The configuration of the EC/KBCs 130 and 301 will be described with reference to FIG. 3.

The EC/KBCs 130 and 301 each comprise a power supply controller 401, a keyboard controller 402, a current measurement circuit 403, a voltage measurement circuit 404, an I$^2$C communication circuit 405, a real time clock (RTC) 406, etc.

The current measurement circuit 403 is a circuit for measuring a current value of power supplied to a battery. The voltage measurement circuit 404 is a circuit for measuring a voltage value of power supplied to a battery.

The power supply controller 401 comprises a processor 401A, a nonvolatile memory (NVM) 401B, a RAM 401C, etc. The processor executes a program loaded from the nonvolatile memory 401B to the RAM 401C. The processor 401A operates as the power supply controller 401 by executing the program.

A program stored in the nonvolatile memory 401B on the tablet 11 side and a program stored in the nonvolatile memory 401B on the keyboard dock 12 side are different programs.

The power supply controller 401 on the keyboard dock 12 side controls lighting of the LEDs 302 depending on a remaining capacity of the battery.

The keyboard controller 402 notifies the CPU 111 of a code corresponding to an operated key on the keyboard.

The I$^2$C communication circuit 405 is a circuit for communication between the EC/KBCs 130 and 301 and communication with a battery.

The RTC 406 is a circuit for measuring the time and date. To the RTC 406, an RTC battery 410 is connected. The RTC 406 is driven by power supplied from the RTC battery 410. The EC/KBCs 130 and 301 can be driven even if the remaining capacities of the batteries are zero.

If the tablet 11 is mounted on the keyboard dock 12, a supply source from which DC power is supplied to the system is determined by the power supply controller 401 on the tablet 11 side. Depending on a determination result, the power supply controller 401 on the tablet 11 notifies the power supply controller 401 on the keyboard dock 12 side of a supply source of DC power, or requests it to supply DC power.

A key code corresponding to an operated key on the keyboard 13 on the keyboard dock 12 side is notified to the tablet 11 by $I^2C$ communication through the power supply controller 401 on the keyboard dock 12 side, whereby the number of pins of a connector between the tablet 11 and the keyboard dock 12 can be reduced.

Figure 4:
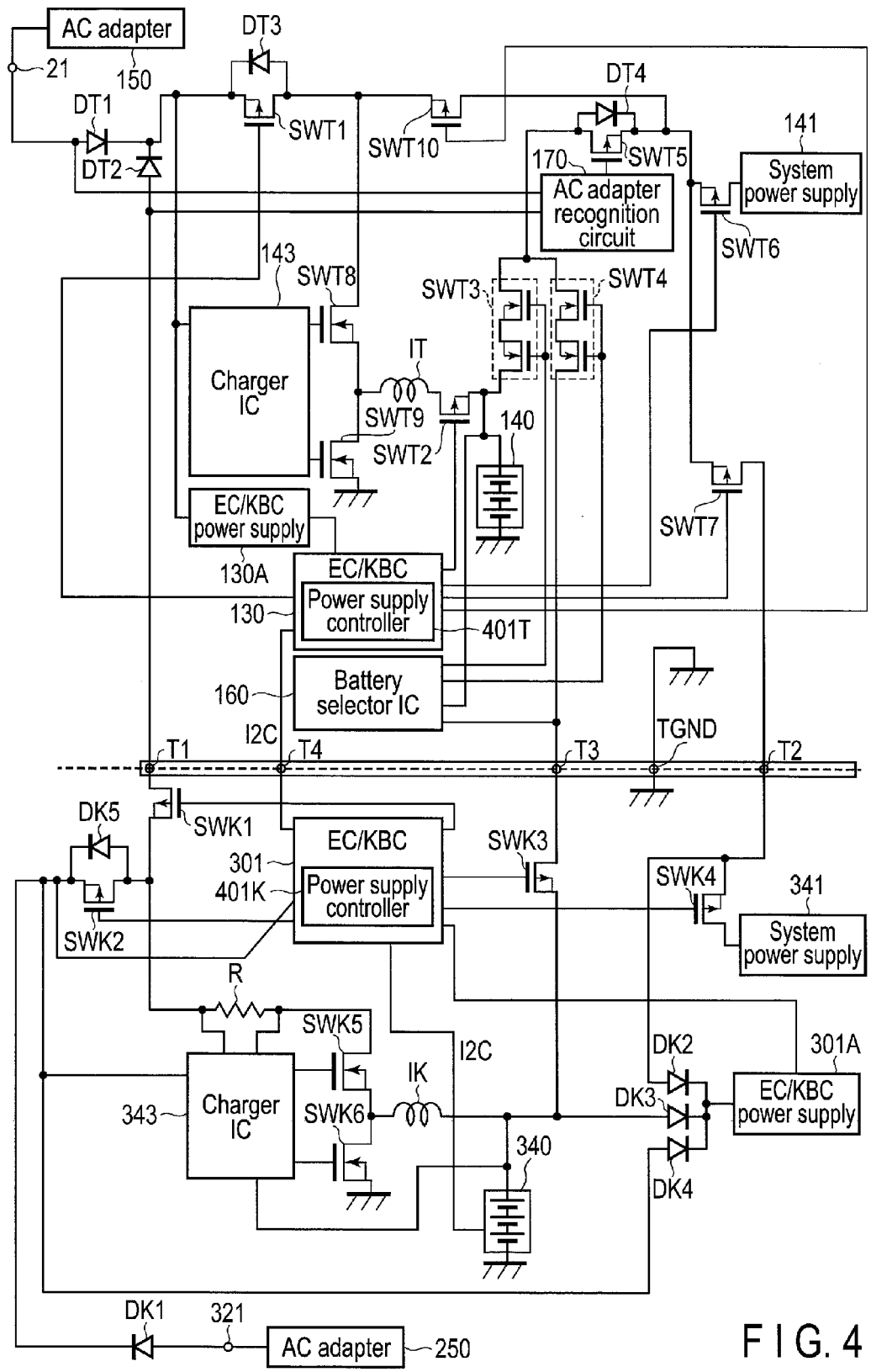
FIG. 4 is an exemplary block diagram showing a circuit for supplying power to the system.

FIG. 4 is a block diagram showing a circuit for supplying power to the system. The circuit which supplies power to the system will be described with reference to FIG. 4.

In order that the power supply controller 401T on the tablet 11 side controls a switch SWT1, the gate of the switch SWT1 and the EC/KBC 130 are electrically connected. In order that the power supply controller 401T on the tablet 11 side controls a switch SWT2, the gate of the switch SWT2 and the EC/KBC 130 are electrically connected. In order that a battery selector IC 160 controls a switch SWT3, the gate of the switch SWT3 and the battery selector IC 160 are electrically connected. In order that the battery selector IC 160 controls a switch SWT4, the gate of the switch SWT4 and the battery selector IC 160 are electrically connected. In order that an AC adapter recognition circuit 170 controls a switch SWT5, the gate of the switch SWT5 and the AC adapter recognition circuit 170 are electrically connected. In order that the power supply controller 401T on the tablet 11 side controls a switch SWT6, the gate of the switch SWT6 and the EC/KBC 130 are electrically connected. In order that the power supply controller 401T on the tablet 11 side controls a switch SWT7, the gate of the switch SWT7 and the EC/KBC 130 are electrically connected. In order that the charger IC 143 controls a switch SWT8, the gate of the switch SWT8 and the charger IC 143 are electrically connected. In order that the charger IC 143 controls a switch SWT9, the gate of the switch SWT9 and the charger IC 143 are electrically connected. In order to control a switch SWT10, the gate of the switch SWT10 and the EC/KBC 130 are electrically connected.

The power supply port 21 on the tablet 11 side is electrically connected to the anode of a diode DT1. The cathode of the diode DT1 is electrically connected to the source of the switch (p-channel metal-oxide-semiconductor field-effect transistor: pMOSFET) SWT1. The anode of a diode DT3 which is a parasitic diode of the switch SWT1 is electrically connected to the drain of the switch SWT1. The cathode of the diode DT3 is electrically connected to the source of the switch SWT1. The drain of the switch SWT1 is electrically connected to the drain of the switch (n-channel metal-oxide-semiconductor field-effect transistor: nMOSFET) SWT10. The source of the switch SWT10 is electrically connected to the source of the switch (pMOSFET) SWT6. The drain of the switch SWT6 is electrically connected to the system power supply 141.

The AC adapter recognition circuit 170 is electrically connected to the power supply port 21 on the tablet 11 side. A terminal T1 is electrically connected to the anode of the diode DT3 and the AC adapter recognition circuit 170. The cathode of the diode DT1 is electrically connected to the cathode of a diode DT2 and the source of the switch SWT1.

An EC/KBC power supply 130A is electrically connected to the cathode of the diode DT1 and the cathode of the diode DT2. The EC/KBC power supply 130A is electrically connected to the EC/KBC 130. The charger IC 143 is electrically connected to the cathode of the diode DT1, the cathode of the diode DT2, the source of the switch SWT1, and the cathode of the diode DT3.

The drain of the switch (nMOSFET) SWT8 is electrically connected to the drain of the switch SWT1 and the drain of the switch SWT10. The drain of the switch (nMOSFET) SWT9 is electrically connected to the source of the switch SWT8. The source of the switch SWT9 is electrically connected to the earth.

One end of an inductor IT is electrically connected to the source of the switch SWT8 and the drain of the switch SWT9. The other end of the inductor IT is electrically connected to the drain of the switch (nMOSFET) SWT2.

One end of the switch SWT3 is electrically connected to the battery 140 and the source of the switch SWT2. The other end of the switch SWT3 is electrically connected to one end of the switch SWT4 and the drain of the switch (pMOSFET) SWT5. The other end of the switch SWT4 is electrically connected to a terminal T3.

The switch SWT3 and the switch SWT4 are each comprised of an nMOSFET and an nMOSFET connected in series. The drain of nMOSFET of one the switch SWT3 is electrically connected to the battery 140 and the source of the switch SWT2. The source of the nMOSFET of one the switch SWT3 is electrically connected to the source of the nMOSFET of another the switch SWT3. The drain of the nMOSFET of another the switch SWT3 is electrically connected to the drain of nMOSFET of one the switch SWT4 and the drain of the switch SWT5. The source of the nMOSFET of one the switch SWT4 is electrically connected to the source of the nMOSFET of another the switch SWT4. The drain of the nMOSFET of another the switch SWT4 is electrically connected to the terminal T3.

The source of the switch SWT5 is electrically connected to the drain of the switch SWT1, the anode of the diode DT3, the source of the switch (pMOSFET) SWT6, and the source of the switch (pMOSFET) SWT7. The drain of the switch SWT6 is electrically connected to the system power supply 141. The drain of the switch SWT7 is electrically connected to the terminal T2.

In order that the power supply controller 401K on the keyboard dock 12 side controls a switch SWK1, the gate of the switch SWK1 and the EC/KBC 301 are electrically connected. In order that the power supply controller 401K on the keyboard dock 12 side controls a switch SWK2, the gate of the switch SWK2 and the EC/KBC 301 are electrically connected. In order that the power supply controller 401K on the keyboard dock 12 side controls a switch SWK3, the gate of the switch SWK3 and the EC/KBC 301 are electrically connected. In order that the power supply controller 401K on the keyboard dock 12 side controls a switch SWK4, the gate of the switch SWK4 and the EC/KBC 301 are electrically connected. In order that the charger IC 343 controls a switch SWK5, the gate of the switch SWK5 and the charger IC 343 are electrically connected. In order that the charger IC 343 controls a switch SWK6, the gate of the switch SWK6 and the charger IC 343 are electrically connected.

The power supply port 321 on the keyboard dock 12 side is electrically connected to the anode of a diode DK1. The cathode of the diode DK1 is electrically connected to the source of the switch (pMOSFET) SWK2, the charger IC 343, and the anode of a diode DK4. The cathode of the diode DK4 is electrically connected to the drain of the switch SWK2.

The drain of the switch (pMOSFET) SWK1 is electrically connected to the terminal T1. The source of the switch SWK1 is electrically connected to the drain of the switch (nMOSFET) SWK5 through a resistor R for current detection. The drain of the switch SWK1 is electrically connected to the drain of the switch SWK2 and the anode of a diode DK5.

The drain of the switch SWK2 is electrically connected to the drain of the switch SWK5 through the resistor R.

The source of the switch SWK5 is electrically connected to the drain of the switch (nMOSFET) SWK6. The source of the switch SWK6 is connected to the earth. One end of an inductor IK is electrically connected to the source of the switch SWK5 and the drain of the switch SWK6. The other end of the inductor IK is electrically connected to the anode of a diode DK3. The cathode of the diode DK3 is electrically connected to an input of an EC/KBC power supply 301A.

The source of the switch (pMOSFET) SWK3 is electrically connected to the battery 340 and the other end of the inductor IK. The drain of the switch SWK3 is electrically connected to the terminal T3.

The source of the switch (pMOSFET) SWK4 is electrically connected to the terminal T2. The drain of the switch SWK4 is electrically connected to the system power supply 341. The anode of a diode DK2 is electrically connected to the terminal T2. The cathode of the diode DK2 is electrically connected to the EC/KBC power supply 301A. The cathode of the diode DK4 is electrically connected to the EC/KBC power supply 301A.

The charging circuit 142 is comprised of the switch SWT8, the switch SWT9, and the inductor IT. The charging circuit 342 is comprised of the switch SWK5, the switch SWK6, and the inductor IK.

A circuit including the charger IC 143, the switch SWT8, the switch SWT9, and the inductor IT comprises a voltage step-down circuit. Further, a circuit including the charger IC 343, the switch SWK5, the switch SWK6, and the inductor IK comprises a voltage step-up circuit.

Next, the states of circuit elements for supplying power to the system in various modes will be described.

If the tablet 11 is mounted on the keyboard dock 12 and the AC adapter 150 and the AC adapter 250 are not connected to the power supply ports, the system is driven by DC power supplied from the battery 340 on the keyboard dock 12 side, and the battery 140 on the tablet 11 side is charged.

A method of supplying DC power from the keyboard dock 12 to the tablet 11 and a method of supplying DC power to the battery 140 on the tablet 11 side are determined depending on the voltage of the battery 140 on the tablet 11 side and the voltage of the battery 340 on the keyboard dock 12 side.

FIG. 5 shows the method of supplying DC power from the keyboard dock 12 to the tablet 11 and the method of supplying DC power to the battery 140 on the tablet 11 side determined depending on the voltage of the battery 140 on the tablet 11 side and the voltage of the battery 340 on the keyboard dock 12 side.

As shown in FIG. 5, if the voltage of the battery 140 on the tablet 11 side is greater than the voltage of the battery 340 on the keyboard dock 12 side (mode 1), the keyboard dock 12 supplies the tablet 11 with DC power from the battery 340 after stepping up its voltage. Further, on the tablet 11 side, the voltage of DC power whose voltage has been stepped up is not stepped up or stepped down to charge the battery 140. The mode 1 will be described later with reference to FIG. 6.

If the voltage of the battery 140 on the tablet 11 side and the voltage of the battery 340 on the keyboard dock 12 side are equal, or if the voltage of the battery 340 on the keyboard dock 12 side is slightly greater than the voltage of the battery 140 on the tablet 11 side (mode 2), the keyboard dock 12 supplies the tablet 11 with DC power from the battery 340 without stepping up its voltage. Further, on the tablet 11 side, the voltage of supplied DC power is not stepped up or stepped down to charge the battery 140. The mode 2 will be described later with reference to FIG. 7.

If the voltage of the battery 340 on the keyboard dock 12 side is greater than the voltage of the battery 140 on the tablet 11 side (mode 3), the keyboard dock 12 supplies the tablet 11 with DC power from the battery 340 without stepping up its voltage. Further, on the tablet 11 side, the voltage of supplied DC power is stepped down to charge the battery 140. The mode 3 will be described later with reference to FIG. 8.

The EC/KBC 130 detects the state of the battery 140, such as voltage, current, temperature and deterioration condition, and the EC/KBC 301 detects the state of the battery 340, such as voltage, current, temperature, and deterioration condition. The EC/KBC 130 and the EC/KBC 301 communicate via an I²C bus, notify each other of the states of the batteries 140 and 340, and determine a switch between the above-described modes 1, 2 and 3 based on the states of the batteries 140 and 340.

Next, the states of circuit elements for supplying power to the system in various modes will be described.

Mode 1) the voltage of the battery 140 on the tablet 11 side is greater than the voltage of the battery 340 on the keyboard dock 12 side.

Figure 6:
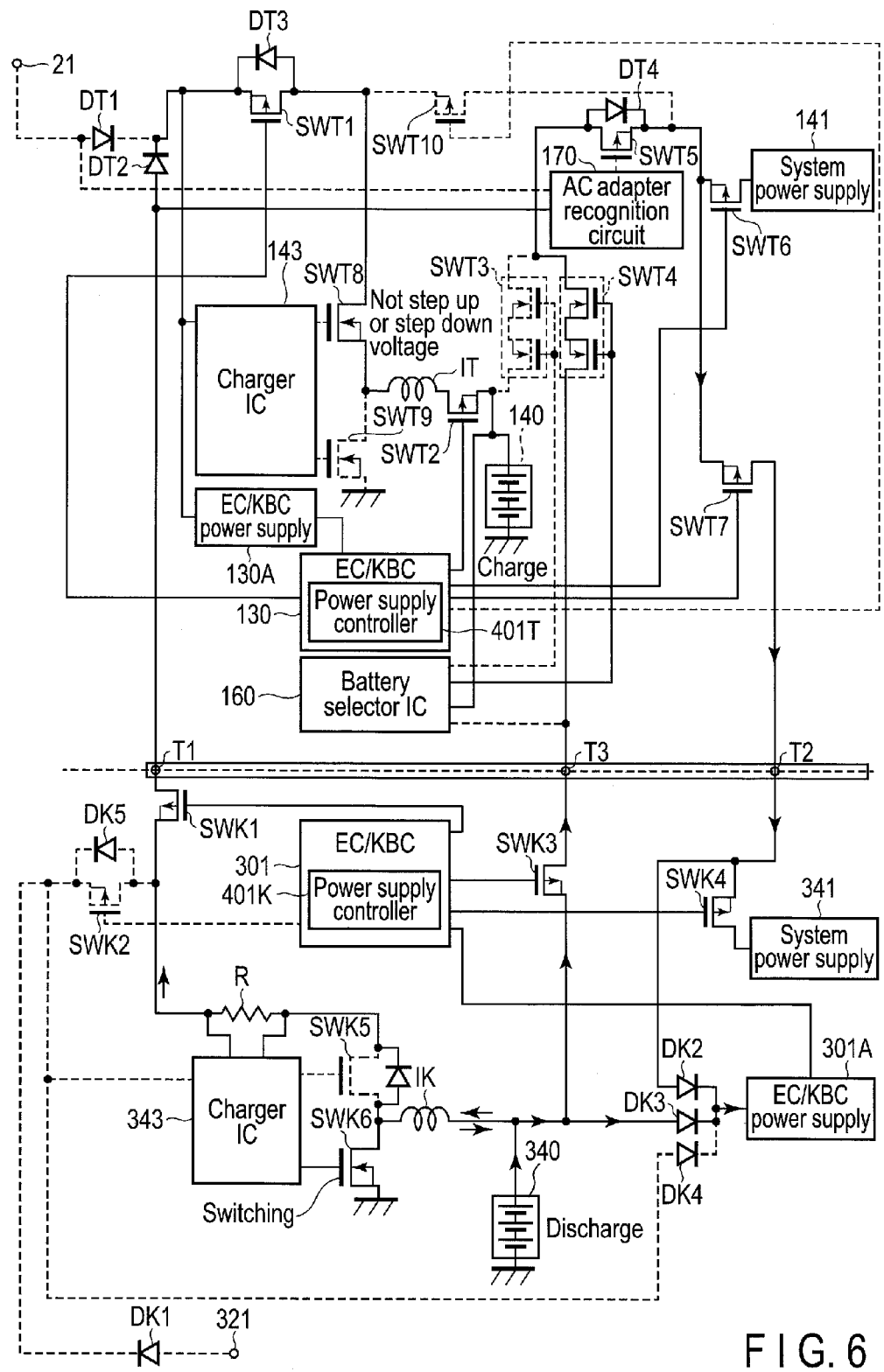
FIG. 6 is an illustration for explaining the case of charging the battery with DC power obtained by stepping up the voltage of DC power from the battery of the keyboard dock.

The case of charging the battery 140 with DC power obtained by stepping up the voltage of DC power from the battery 340 of the keyboard dock 12 will be described with reference to FIG. 6.

The power supply controller 401K on the keyboard dock 12 side sets the switch SWK1 and the switch SWK3 in a conducting state. The power supply controller 401K on the keyboard dock 12 side requests the charger IC 343 to step up the voltage of DC power from the battery 340. The charger IC 343 keeps the switch SWK5 in a nonconducting state all the time. The charger IC 343 steps up the voltage of DC power from the battery 340 by alternately switching the state of the switch SWK6 between a conducting state and a nonconducting state.

DC power whose voltage has been stepped up is supplied to the EC/KBC power supply 130A and the charger IC 143 through the switch SWK1, the terminal T1, and the diode DT2. The EC/KBC power supply 130A steps down the voltage of supplied DC power, and supplies DC power whose voltage has been stepped down to the EC/KBC 130.

The power supply controller 401T on the tablet 11 side sets the switch SWT2, the switch SWT6, and the switch SWT7 in a conducting state. Further, the power supply controller 401T on the tablet 11 side sets the switch SWT10 in a nonconducting state. The power supply controller 401K on the keyboard dock 12 side sets the switch SWT4 in a conducting state.

The power supply controller 401T on the tablet 11 side requests the charger IC 143 to charge the battery 140 without stepping up or stepping down its voltage. The charger IC 143 sets the switch SWT8 in a conducting state, and sets the switch SWT9 in a nonconducting state. DC power whose voltage has been stepped up on the keyboard dock 12 side is supplied to the battery 140 without stepping up or stepping down its voltage.

The battery selector IC 160 recognizes that DC power (whose voltage is not stepped up) has been supplied from the battery 340, and sets the switch SWT4 in a conducting state. The power supply controller 401T on the tablet 11 side requests the AC adapter recognition circuit 170 to set the switch SWT5 in a nonconducting state. The AC adapter recognition circuit 170 sets the switch SWT5 in a conducting state. The power supply controller 401T on the tablet 11 side sets the switch SWT6 in a conducting state.

DC power (whose voltage is not stepped up) supplied from the battery 340 is supplied to the system power supply 141 through the switch SWK3, the terminal T3, the switch SWT4, the switch SWT5, and the switch SWT6. The system power supply 141 steps down the voltage of supplied DC power, and supplies DC power whose voltage has been stepped down to each module of the tablet 11.

DC power (whose voltage is not stepped up) supplied from the battery 340 is supplied to the system power supply 341 through the switch SWK3, the terminal T3, the switch SWT4, the switch SWT5, the switch SWT7, the terminal T2, and the switch SWK4. The system power supply 341 steps down the voltage of supplied DC power, and supplies DC power whose voltage has been stepped down to each module of the keyboard dock 12.

Mode 2) the voltage of the battery 140 on the tablet 11 side and the voltage of the battery 340 on the keyboard dock 12 side are equal, or the voltage of the battery 340 on the keyboard dock 12 side is slightly greater than the voltage of the battery 140 on the tablet 11 side.

The case where the voltage of the battery 140 on the tablet 11 side and the voltage of the battery 340 on the keyboard dock 12 side are equal, or the voltage of the battery 340 on the keyboard dock 12 side is slightly greater than the voltage of the battery 140 on the tablet 11 side will be described with reference to FIG. 7.

DC power supplied from the battery 340 is supplied to the EC/KBC power supply 301A through the diode DK3. The EC/KBC power supply 301A steps down the voltage of supplied DC power, and supplies DC power whose voltage has been stepped down to the EC/KBC 301.

The power supply controller 401K on the keyboard dock 12 side notifies the charger IC 343 of supplying the tablet 11 with DC power from the battery 340 without stepping up or stepping down its voltage. The charger IC 343 sets the switch SWK5 in a conducting state, and sets the switch SWK6 in a nonconducting state.

The power supply controller 401K on the keyboard dock 12 side sets the switch SWK1 in a conducting state. The power supply controller 401T on the tablet 11 side requests the charger IC 143 to charge the battery 140 without stepping up or stepping down its voltage. The charger IC 143 sets the switch SWT8 in a conducting state, and sets the switch SWT9 in a nonconducting state. DC power whose voltage has not been stepped up or stepped down on the keyboard dock 12 side is supplied to the battery 140 without stepping up or stepping down its voltage.

The power supply controller 401K on the keyboard dock 12 side makes the switch SWK3 conduct. The battery selector 160 makes the switch SWT4 conduct. Since the AC adapters 150 and 250 are not connected, the AC adapter recognition circuit 170 makes the switch SWT5 conduct. The power supply controller 401T on the tablet 11 side sets the switch SWT10 in a nonconducting state.

DC power supplied from the battery 340 is supplied to the EC/KBC power supply 130A through the switch SWK3, the switch SWK4, the switch SWT5, and the diode DT3. The EC/KBC power supply 130A steps down the voltage of supplied DC power, and supplies DC power whose voltage has been stepped down to the EC/KBC 130.

The power supply controller 401T on the tablet 11 side sets the switch SWT6 and the switch SWT7 in a conducting state.

DC power supplied from the battery 340 is supplied to the system power supply 141 through the switch SWK3, the terminal T3, the switch SWT4, the switch SWT5, and the switch SWT6. The system power supply 141 steps down the voltage of supplied DC power, and supplies DC power whose voltage has been stepped down to each module of the tablet 11.

DC power supplied from the battery 340 is supplied to the system power supply 341 through the switch SWK3, the terminal T3, the switch SWT4, the switch SWT5, the switch SWT7, and the terminal T2, and the switch SWK4. The system power supply 341 steps down the voltage of supplied DC power, and supplies DC power whose voltage has been stepped down to each module of the keyboard dock 12.

Mode 3) the voltage of the battery 340 on the keyboard dock 12 side is greater than the voltage of the battery 140 on the tablet 11 side.

Figure 8:
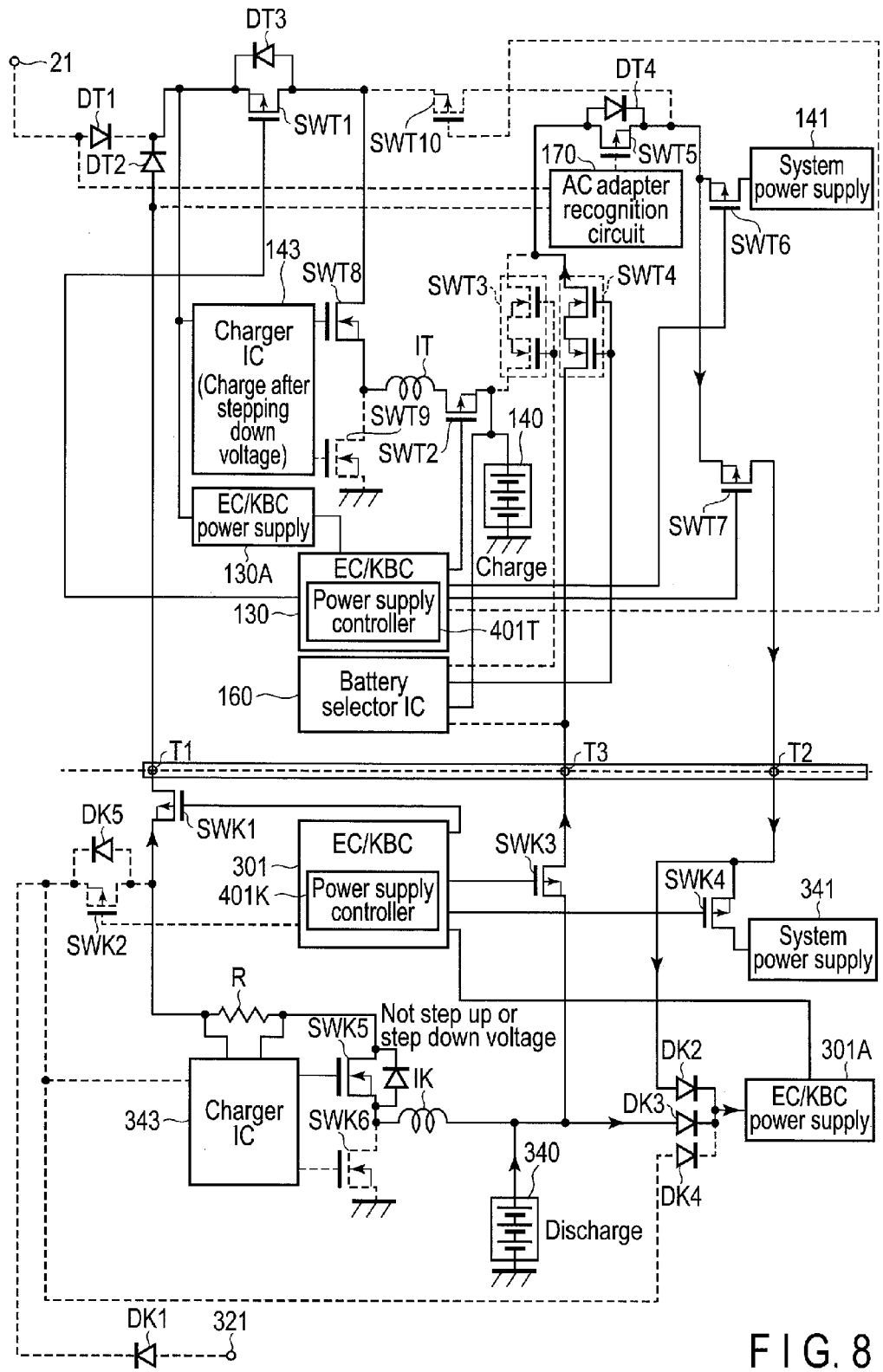
FIG. 8 is an illustration showing the case where the battery on the tablet side is charged with DC power from the battery of the keyboard dock if the voltage of the battery on the tablet side is greater than the voltage of the battery on the keyboard dock side.

The case where the voltage of the battery 340 on the keyboard dock 12 side is greater than the voltage of the battery 140 on the tablet 11 side will be described with reference to FIG. 8.

DC power supplied from the battery 340 is supplied to the EC/KBC power supply 301A through the diode DK3. The EC/KBC power supply 301A steps down the voltage of supplied DC power, and supplies DC power whose voltage has been stepped down to the EC/KBC 301.

The power supply controller 401K on the keyboard dock 12 side notifies the charger IC 343 of supplying the tablet 11 with DC power from the battery 340 without stepping up or stepping down its voltage. The charger IC 343 sets the switch SWK5 in a conducting state, and sets the switch SWK6 in a nonconducting state.

The power supply controller 401K on the keyboard dock 12 side sets the switch SWK1 in a conducting state. The power supply controller 401K on the keyboard dock 12 side requests the charger IC 143 to charge the battery 140 with DC power after stepping down its voltage. The charger IC 143 sets the switch SWT9 in a nonconducting state. The charger IC 143 steps down the voltage by alternately switching the state of the switch SWT8 between a conducting state and a nonconducting state.

The power supply controller 401K on the keyboard dock 12 side makes the switch SWK3 conduct. The battery selector 160 makes the switch SWT4 conduct. Since the AC adapters 150 and 250 are not connected, the AC adapter recognition circuit 170 makes the switch SWT5 conduct.

DC power supplied from the battery 340 is supplied to the EC/KBC power supply 130A through the switch SWK3, the switch SWK4, the switch SWT5, and the diode DT3. The EC/KBC power supply 130A steps down the voltage of supplied DC power, and supplies DC power whose voltage has been stepped down to the EC/KBC 130.

The power supply controller 401T on the tablet 11 side sets the switch SWT6 and the switch SWT7 in a conducting state.

DC power supplied from the battery 340 is supplied to the system power supply 141 through the switch SWK3, the terminal T3, the switch SWT4, the switch SWT5, and the switch SWT 6. The system power supply 141 steps down the voltage of supplied DC power, and supplies DC power whose voltage has been stepped down to each module of the tablet 11.

DC power supplied from the battery 340 is supplied to the system power supply 341 through the switch SWK3, the terminal T3, the switch SWT4, the switch SWT5, the switch SWT7, and the terminal T2, and the switch SWK4. The system power supply 341 steps down the voltage of supplied DC power, and supplies DC power whose voltage has been stepped down to each module of the keyboard dock 12.

Figure 9:
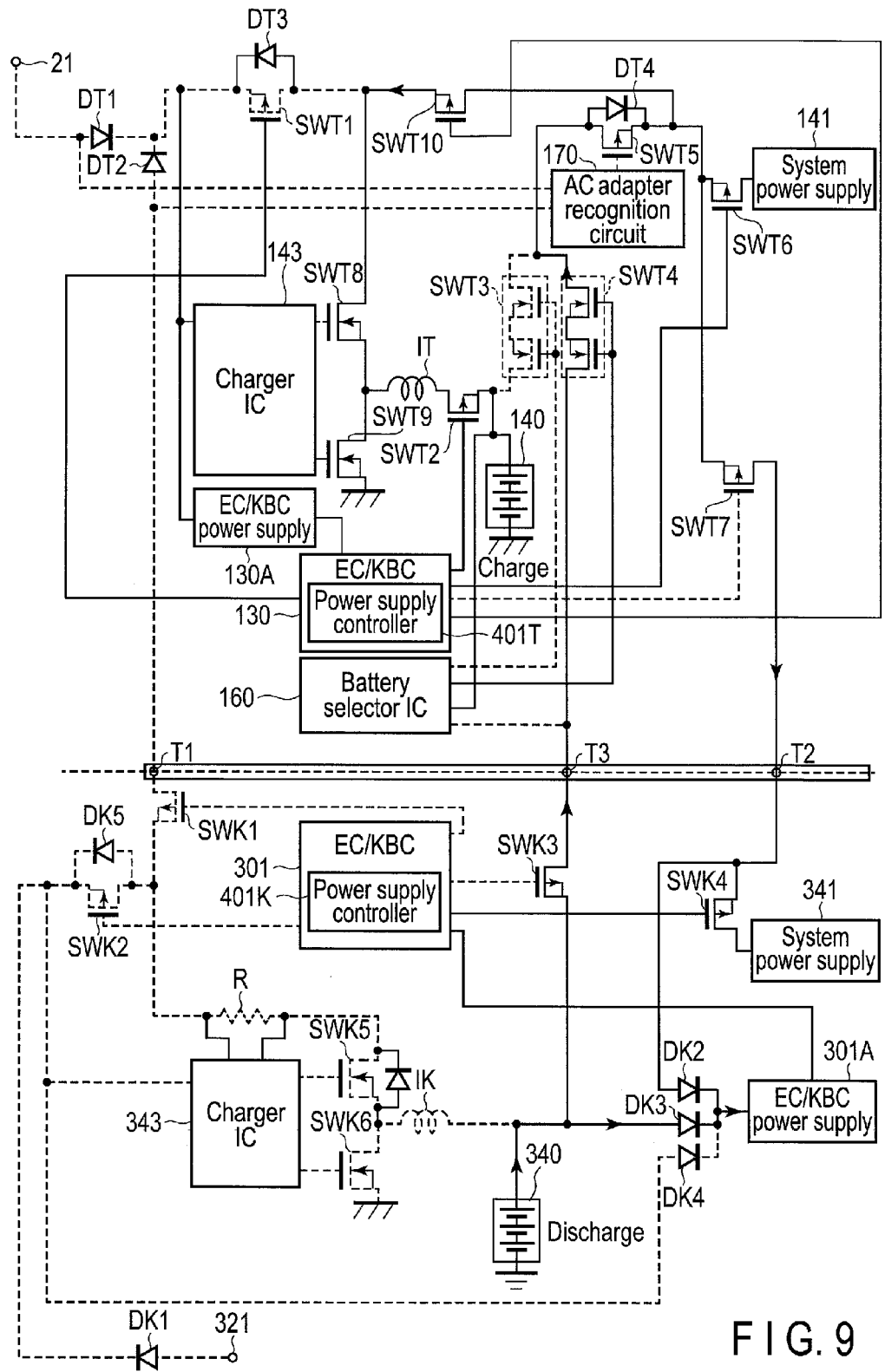
FIG. 9 is an illustration for explaining a modification in a mode 2 or a mode 3.

If the voltage is not stepped up on the keyboard dock 12 side, because the diode DT2 for reverse prevention is provided on a voltage step-up line, DC power may be supplied through a power supply path shown in FIG. 9. In FIG. 9, the switch SWK1, the switch SWK5, and the switch SWK6 are in a nonconducting state. The switch SWT10 is in a conducting state.

The charger IC 343 on the keyboard dock 12 side may be controlled by the EC/KBC 130 on the tablet 11 side without providing the EC/KBC 301 on the keyboard dock 12 side.

If the number of cells of the battery 340 on the keyboard dock 12 side is made greater than that of the battery 340 on the keyboard dock 12 side, the voltage on the keyboard dock 12 side need not be stepped up when the voltage of the battery 140 on the tablet 11 side is greater than the voltage of the battery 340 on the keyboard dock 12 side.

According to the above-described embodiment, the voltage step-down circuit steps down the voltage or the voltage step-up circuit steps up the voltage, or the voltage step-down circuit does not step down the voltage and the voltage step-up circuit does not step up the voltage, depending on the voltage of the first battery and the voltage of the second battery. Thus, the voltage is stepped up or stepped down by one step, or is not stepped up or stepped down, whereby a conversion loss of DC power becomes small.

For example, conversion efficiency in each mode is shown in FIG. 10. As shown in FIG. 10, the conversion efficiency takes values between 0.91 and 1.00, and a conversion loss of DC power is small.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system comprising an electronic device and an extension device which the electronic device is detachable from and attachable to,
    wherein the electronic device comprises:
    a first battery; and
    a voltage step-down circuit to charge, when the electronic device is not connected to an external AC power supply, the first battery with DC power supplied from the extension device after stepping down or without stepping down voltage of the DC power supplied from the extension device,
    wherein the extension device comprises:
    a second battery; and
    a voltage step-up circuit to supply, when the electronic device is not connected to an external AC power supply, the electronic device with DC power of the second battery after stepping up or without stepping up voltage of the DC power of the second battery, and
    wherein when voltage of the first battery is greater than voltage of the second battery:
    the extension device supplies the electronic device with the DC power of the second battery after stepping up the voltage of the DC power of the second battery by the voltage step-up circuit; and
    the voltage step-down circuit of the electronic device supplies the first battery with the DC power supplied from the extension device without stepping down the voltage of the DC power supplied from the extension device,
    wherein when the voltage of the first battery is lower than the voltage of the second battery:
    the extension device supplies the electronic device with the DC power of the second battery without stepping up the voltage of the DC power of the second battery by the voltage step-up circuit; and
    the voltage step-down circuit of the electronic device supplies the first battery with the DC power supplied from the extension device after stepping down the voltage of the DC power supplied from the extension device.

2. The system of claim 1, wherein when the voltage of the second battery and the voltage of the first battery are equal:
    the extension device supplies the electronic device with the DC power of the second battery without stepping up the voltage of the DC power of the second battery by the voltage step-up circuit; and
    the voltage step-down circuit of the electronic device supplies the first battery with the DC power supplied from the extension device without stepping down the voltage of the DC power supplied from the extension device.

3. The system of claim 1, wherein
    the electronic device further comprises a first power management controller which detects a first state of voltage, current or temperature of the first battery,
    the extension device further comprises a second power management controller which connects to the first power management controller and detects a second state of voltage, current or temperature of the second battery, and
    the first power management controller and the second power management controller control stepping up or stepping down of the voltage of the DC power of the second battery by notifying each other of the first state and the second state.

* * * * *